United States Patent [19]

Needes

[11] 4,251,344

[45] Feb. 17, 1981

[54] POROUS NICKEL COATED ELECTRODES

[75] Inventor: Christopher R. S. Needes, Newark, Del.

[73] Assignee: E. I. Du Pont de Nemours and Company, Wilmington, Del.

[21] Appl. No.: 114,242

[22] Filed: Jan. 22, 1980

[51] Int. Cl.$^3$ .................. C25B 11/06; B05D 5/12; H01M 4/98
[52] U.S. Cl. .................. 204/290 R; 204/292; 204/293; 427/123; 427/336; 427/376.8; 427/377; 429/44; 429/45
[58] Field of Search .............. 204/290 R, 290 F, 292, 204/293; 429/44, 45; 427/123, 376.8, 377

[56] References Cited

U.S. PATENT DOCUMENTS

| | | | |
|---|---|---|---|
| 3,291,642 | 12/1966 | Jung et al. | 429/45 |
| 3,379,635 | 4/1968 | von Doehren et al. | 204/284 |
| 3,408,231 | 10/1968 | Dickinson et al. | 156/8 |
| 3,437,526 | 4/1969 | Lindholm et al. | 429/45 X |
| 3,637,437 | 1/1972 | Goldberger | 429/44 |
| 3,846,344 | 11/1974 | Larson et al. | 252/466 |
| 3,926,844 | 12/1975 | Benezur-Urmossy | 204/293 X |
| 4,024,044 | 5/1977 | Brannan et al. | 204/242 |
| 4,049,580 | 9/1977 | Oden et al. | 252/466 |
| 4,116,804 | 9/1978 | Needes | 204/284 |

FOREIGN PATENT DOCUMENTS 1073492  6/1967  United Kingdom .................. 429/45

*Primary Examiner*—F. C. Edmundson

[57] ABSTRACT

An improved electrode having a surface mixture of nickel and porous nickel produced by applying a paste mixture of $NiAl_2$ and $Ni_3B$ together with a vehicle to a substrate. After burning off the vehicle and firing in air at a temperature of 450° to 650° C. and thereafter sintering at a temperature of 800° to 900° C. in nitrogen, the coating on the substrate contains $Ni_2Al_3$, $NiAl_2B$ and nickel together with a thin overlayer of $B_2O_3$. After removing the intermetallic aluminum, boron and boron oxide by dissolution with sodium hydroxide, the surface of the substrate contains Raney nickel supported on a structure of nickel. The resulting electrodes can be used as cathodes in water or brine electrolysis cells.

7 Claims, No Drawings

POROUS NICKEL COATED ELECTRODES

BACKGROUND OF THE INVENTION

1. Field of the Invention

This invention relates to an improved electrode having a porous nickel surface. More particularly, it relates to a paste composition that can be used to coat a substrate and a process that results in a nickel supported porous nickel coated electrode useful as a cathode in water or brine electrolysis cells.

2. Prior Art

It is well-known that an active porous nickel surface can be produced by selectively dissolving a soluble component such as aluminum or zinc from an alloy of nickel and the soluble component. Such porous nickel and the alloy from which it is produced are frequently referred to respectively as Raney nickel and Raney alloy, named after their inventor. Several specific methods for producing Raney nickel and a variety of uses for this material have been suggested in the past. In U.S. Pat. No. 4,049,580, Oden et al., a method is suggested for making a supported Raney nickel catalyst by coating a nickel substrate with aluminum or aluminum nickel alloy. This process produces a thick layer of $NiAl_3$ on a nickel substrate. Said layer is a precursor of a Raney nickel catalyst. The inventor suggests in column 1, lines 30-34 that the production of $Ni_2Al_3$ as a surface coating is undesirable. In contrast I have found as set forth in my U.S. Pat. No. 4,116,804 that an improved electrode having a porous nickel surface can be formed by a process which includes the interdiffusion of aluminum and nickel at temperatures of at least 660° C. to form a nickel aluminum alloy ($Ni_2Al_3$) layer from which aluminum is subsequently selectively dissolved. This electrode, when used as a cathode in an electrolytic cell for producing hydrogen, chlorine and caustic from brine, exhibits exceptionally low hydrogen overvoltage.

Dickenson et al., U.S. Pat. No. 3,408,231, also discloses a method of making a negative electrode by forming a layer of nickel aluminide ($Ni_2Al_3$) and then dissolving out the diffused aluminum with a caustic solution. Although many of the prior art electrodes formed from Raney nickel catalysts are good cathodes, I have continued to search for an electrode that can be inexpensively produced, has outstanding mechanical strength so as to have a long useful life and reduces power consumption in a chlor-alkali plant because of low hydrogen overvoltage.

SUMMARY OF THE INVENTION

The present invention provides an improved electrode for use as a cathode in water or brine electrolysis cells having either a diaphragm or a membrane separator. The electrode has high activity, exhibits exceptionally low hydrogen overvoltage, and possesses outstanding mechanical strength together with a low cost of production.

The electrode of this invention is formed by first preparing a paste consisting of a powder mixture of $NiAl_3$ and $Ni_3B$. The paste is formed by mixing the powders with an ethylene glycol copolymer hexyl carbitol vehicle-solvent system.

The present invention also provides an improved process for forming a continuous surface layer of active porous nickel mixed with nickel in electrical contact with a conductive metal core. The process involves applying the paste mixture set forth above using spraying, brushing or dipping of the paste and then drying the composition at 125° C. Thereafter, the vehicle is burned out at 325° C. Firing at 550° C. in air converts the $Ni_3B$ component of the surface coating to nickel and $B_2O_3$. Thereafter sintering at 900° C. in nitrogen forms a precursor coating of $Ni_2Al_3$ and $NiAl_2B$ with a thin overlayer of $B_2O_3$. This intermetallic coating will be about 100 micrometers thick and is thereafter subjected to sodium hydroxide or potassium hydroxide to remove 60 to 90 percent of the intermetallic aluminum and intermetallic boron as well as residual $B_2O_3$ by dissolution. Lastly, the coating is treated with $NaNO_3$ or $H_2O_2$ to stabilize it toward oxidation when the coating is dried. Analysis of the base coating shows it to be a mixture of nickel and Raney nickel on the surface of the electrode. This procedure provides for easily controlled operations that are readily adaptable to large scale processing. Furthermore, it provides a very cost effective means of retrofitting an existing brine electrolysis cell with a minimum of disassembly.

DETAILED DESCRIPTION OF THE INVENTION

The substrate for the cathode may be any conveniently shaped form of perforated metal, expanded metal or screen; a screen substrate is preferred for commercial brine electrolysis. The substrate material should possess sufficient mechanical strength and corrosion resistance to permit extended operation in a chlor-alkali environment. The cathode material commonly used in brine electrolysis cells is mild or low carbon steel and this is the preferred substrate material in the present invention.

Prior to any coating operation, the surface of the steel substrate is thoroughly cleaned by any deposits of oil, grease and dirt by solvent washing. Following this, the steel is grit blasted in order to stress the surface and thereby improve the adhesion of the subsequently applied coating.

The paste used for coating the steel comprises a mixture of $Ni_3B$ and $NiAl_3$ powders in the 0.5 to 25 micrometer size range; the preferred size range is 1 to 10 micrometers.

In terms of total solids, the $Ni_3B$ content should vary from 20 to 60 wt. percent and the $NiAl_3$ from 40 to 80 wt. percent. Compositions that fall outside these limits yield cathodes that are mechanically weak (insufficient $Ni_3B$) or relatively inactive (insufficient $NiAl_3$). The preferred range is 30 to 50 wt. percent $Ni_3B$ and 50 to 70 wt. percent $NiAl_3$ since it is this range of compositions that permits the development of highly active coatings with excellent mechanical strength.

The intermetallic particles are mixed with an inert organic liquid vehicle by mechanical mixing to form a paste-like composition. Examples of the organic liquid vehicles which can be used are the aliphatic alcohols; esters of such alcohols, for example, the acetates and propionates; terpenes such as pine oil, terpineol and the like; solutions of resins such as the polymethacrylates of lower alcohols or solutions of ethyl cellulose in solvents such as pine oil and the monobutyl ether of ethylene glycol monoacetate.

The preferred vehicle component of the paste comprises an ethylene glycol copolymer (20 wt. percent) dissolved in hexyl carbitol. The vehicle: solids ratio should be maintained in the range 1:4 to 1:8 with the preferred range being 1:5 to 1:6. Outside these limits, problems with insufficient particle dispersion and wetting (less than 1:8) and with poor paste adhesion during coating (more than 1:4) are experienced. The above figures translate into a preferred range of ethylene glycol copolymer:solids ratios of between 1:25 to 1:30.

The total solvent (hexyl carbitol) content of the paste should not exceed 50 wt. percent (slurry at this point). Above this level, the material becomes extremely thin and requires too many coating operations to build up a desirable coating thickness. In addition, it becomes very difficult to maintain the homogeneity of the slurry and the solids rapidly settle to the bottom of the container. The actual solvent content does depend to a large extent on the mode of coating to be used; for example, spraying requires a solvent content of 35 to 50 wt. percent whereas brush painting requires a thicker composition, hence a lower solvent level, i.e., 20 to 40 wt. percent. The composition for dip-coating requires even less solvent, the range 10 to 35 wt. percent being suitable.

Regardless of the method of application, the final coating should be developed only after a series of coating and drying (125° C. in air) operations. It is undesirable to apply the complete coating thickness in one step. Such a procedure results in the formation of coatings that are less dense and less well sintered than those produced from a multilayer procedure. At least three coating steps are required for the development of a coating with optimum properties. A dried coating thickness of at least 100 micrometers is desirable.

The coated substrate is then subjected to a series of three heat treatments, the first of which is an air firing at 275° to 350° C. for 10 to 30 minutes in order to burn out the vehicle. Burnout conditions are not critical; the preferred conditions are those given above.

The second heat treatment involves the conversion of the nickel boride ($Ni_3B$) to nickel metal and boron oxide ($B_2O_3$). It is preferred to carry this out in air and in the temperature range 500° to 600° C. for times ranging from 10 to 40 minutes. At temperatures below 450° C., the reaction proceeds too slowly and often incompletely. At temperatures above 650° C. the protection afforded by the $B_2O_3$ starts to break down and some oxidation of the nickel occurs.

The third heat treatment involves the sintering of the nickel particles and the simultaneous reactive bonding of the $NiAl_3$ particles by reaction with the nickel to form a precursor layer of $Ni_2Al_3$. The $B_2O_3$ present acts as a sintering promoter and permits the use of a sintering temperature as low as 800° C. Sintering is done in a nitrogen or reducing atmosphere preferably in the temperature range 800° to 900° C. and for times of 10 to 20 minutes (depending on temperature). Below 750° C. very little sintering occurs even after 120 to 180 minutes and the resultant structure is mechanically weak and poorly adherent to the steel. Above 950° C. the reaction between the $NiAl_3$ and the nickel is so rapid, i.e., less than 5 minutes, that the condition is impractical. Longer excursions at such temperatures result in the exclusive formation of the aluminum-deficient $Ni_2Al_3$ (40 wt. percent Al) and NiAl, both of which can be detrimental to the activity of the final electrode.

A second compound having a stoichiometry consistent with $NiAl_2B$, is present in the precursor structure along with $Ni_2Al_3$. The origin of this phase, itself a precursor to active porous nickel, and therefore similarly advantageous to the activity of a cathode coating as is $Ni_2Al_3$, has not been established. However, X-ray diffraction data suggests that the proportion of $NiAl_2B$ increases as the time of sintering increases and for this reason, it is probable that the $NiAl_2B$ forms as a result of the interaction between $Ni_2Al_3$ and $B_2O_3$, that is:

$$2Ni_2Al_3 + B_2O_3 = 2NiAl_2B + Al_2O_3 + 2Ni$$

The relative proportion of $Ni_2Al_3$ and $NiAl_2B$ in the precursor structure is not a critical factor in the determination of cathode activity.

The fired thickness of the coating should be at least 100 micrometers; however, the most preferred range of thicknesses is between 150 and 300 micrometers.

The next step in the development of the porous nickel coating is the removal by dissolution of at least 60 wt. percent but more preferably between 80 and 95 wt. percent of the intermetallic aluminum and intermetallic boron in the coating. Generally a strong base, such as, NaOH, KOH, or other strongly basic solution, capable of dissolving the intermetallic aluminum and intermetallic boron is used in the leaching step. It is preferable to carry out the leaching in aqueous caustic solutions containing between 5 and 40 wt. percent NaOH and at temperatures between 25° C. and 105° C. However, it is undesirable to use the most extreme conditions, i.e., 40 wt. percent NaOH at 105° C. to initiate dissolution because the violence of the reaction will cause mechanical damage to the coating. Instead, it is much more desirable to proceed with a two or even three stage operation of the following type:

10 wt. percent NaOH at room temperature rising to 50° C. over 4 hours, 20 wt. percent NaOH at 60° C. to 80° C. over 4 hours and, 40 wt. percent NaOH at 90° C. to 105° C. up to 6 hours.

After leaching, the active nickel coating may exhibit a tendency to heat when exposed to air. This self-heating tendency could possibly lead to problems of pyrophoricity. However, an optional step of chemically treating the porous nickel layer can be used to eliminate this potential problem. Convenient methods for this chemical treatment include immersing the porous nickel for at least one hour and usually less than four hours in a dilute aqueous solution containing for example, by weight (a) 3 percent $NaNO_3$ or (b) 3 percent $K_2Cr_2O_7$ or (c) 3 percent $NaClO_3$ and 10 percent NaOH or (d) 0.2 percent $H_2O_2$.

The cathodes of this invention are useful as the cathodes of cells intended for the electrolysis of brine, water or the like. The electrodes are particularly preferred for use in brine electrolysis cells, wherein the high electrochemical activity of the surface coating remains constant during extended use. When the electrode is intended for use in a brine-electrolysis diaphragm cell, the diaphragm can be applied directly to the surface of the coating. For example, a tubular screen electrode, with suction established through the inside of the tube, can be immersed into an aqueous dispersion of polytetrafluoroethylene fibers and asbestos fibers. The fibers are sucked onto the outer surface of the screen until a diaphragm of the desired thickness is formed. After removal of the suction, water is removed from the assembly, as for example, by heating at 95° C. for five hours. To complete diaphragm fabrication, the assembly is then heated at 350° C. for about one-half hour in an inert atmosphere.

As is known in the art, the satisfactory operating lifetime of such diaphragm is not as long as that of the cathodes of the brine electrolysis cells. Economics dictates that the diaphragms must be changed several times during the operating life of the cathode. With electrodes of the present invention, the diaphragms can be readily stripped from the surface of the coating and replaced many times without harm to the electrochemical activity or mechanical properties of the electrode. Similar satisfactory results are obtained with other diaphragm materials and with membrane materials.

Conventional commerical brine electrolysis cells for the production of chlorine, hydrogen and caustic usually employ mild steel as the cathode material. Under typical operating conditions at a 155 mA/cm$^2$ (1 A/in$^2$) current density, such mild steel cathodes have a hydrogen overvoltage of about 0.23 V. Reduction of this overvoltage can produce a significant savings in energy consumption and cost. The cathodes of the present invention provide such savings, in that when substituted for the conventional mild steel cathodes, they effect significant reductions in the voltage requirements.

In the following Examples, all percents (%) are by weight unless otherwise specified.

EXAMPLE I

A paste composition comprising 31.6 percent Ni$_3$B and 50.1 percent NiAl$_3$ powders, 14.3 percent vehicle (20 percent ethylene glycol copolymer in hexyl carbitol) and an additional 4 percent hexyl carbitol was thoroughly mixed and then blended on a three roll mill. The procedure for milling consisted of four passes, the first at a roll pressure of 3.4 kg/cm$^2$ (50 p.s.i.), the second at 6.8 kg/cm$^2$ (100 p.s.i.) and the third and fourth at 13.6 kg/cm$^2$ (200 p.s.i.).

A mild steel coupon was solvent cleaned with perchlor-ethylene and then grit-blasted with #60 Al$_2$O$_3$ grit at 2 kg/cm$^2$ (30 p.s.i.). An area on the coupon corresponding to 6.45 cm$^2$ (1 square inch) was then screen printed with the above composition to yield a coating with a thickness of approximately 50 micrometers. The coating was then dried by heating to 125° C. for 20 minutes. The foregoing process was then repeated until a coating thickness of 250 micrometer was achieved.

The coated steel coupon was then heated at 325° C. for fifteen minutes in order to burn off the organic vehicle. Following this, the temperature was raised to 550° C. and the coupon held at this temperature for 30 minutes to allow the conversion of the Ni$_3$B to Ni and B$_2$O$_3$. Finally, the coupon was transferred to a nitrogen furnace and heated at 900° C. for 20 minutes in order to sinter the Ni and NiAl$_3$ particles and convert them to Ni$_2$Al$_3$ (and NiAl$_2$B). After this treatment the coupon was allowed to cool in a current of nitrogen for 30 minutes after which time it was removed from the furnace and allowed to air cool.

The coated coupon was then treated to leach out the intermetallic aluminum and intermetallic boron by immersion in a solution of 10 percent NaOH in water for a period of 4 hours during which time the solution temperature was increased from ambient to 50° C. Following the cessation of hydrogen gas evolution, the coupon was transferred to a second solution of 20 percent NaOH in water maintained at 60° C. and leached for a period of 4 hours during which time the temperature was increased to 80° C. Finally in a third step, the coupon was boiled in 40 percent NaOH at 105° to 110° C. for a period of 3 hours after which time no further hydrogen gas evolution was observed to occur.

The treated coupon was then made the cathode in an electrochemical cell operated at 96° C. with a catholyte comprising 12 percent NaOH and 16 percent NaCl. The cathode potential was measured with respect to a saturated calomel electrode by use of a Luggin capillary at current densities of 70, 145 and 290 mA/cm$^2$ (0.47, 0.94 and 1.88 A/in$^2$). The cathode potentials measured were 1.110, 1.121 and 1.135 V, respectively. An untreated mild steel coupon used as the cathode in the cell yielded cathode potentials of 1.287, 1.358, and 1.422 V on the same basis.

EXAMPLE II

A paste composition comprising 25.3 percent Ni$_3$B and 40.2 percent NiAl$_3$ powders, 11.4 percent vehicle (same as in Example I) plus an additional 23.1 percent hexyl carbitol was thoroughly mixed and then blended on a three roll mill. The procedure for milling consisted of four passes, the first two at a roll pressure of 6.8 kg/cm$^2$ (100 p.s.i.) and the third and fourth at 13.6 kg/cm$^2$ (200 p.s.i.).

A mild steel coupon was solvent cleaned with perchlor-ethylene and then grit-blasted with #60 Al$_2$O$_3$ grit at 2 kg/cm$^2$ (30 p.s.i.). An area on the coupon corresponding to 6.45 cm$^2$ (1 square inch) was then brush painted using the above composition to yield a coating approximately 25 micrometers thick. The coating was then dried at 125° C. for 10 minutes. The foregoing process was then repeated until a coating thickness of approximately 250 micrometers was built up on the surface of the steel substrate. All subsequent processing was carried out according to the details given in Example I.

The treated coupon was then made the cathode in an electrochemical cell operated at 96° C. with a catholyte comprising 12 percent NaOH and 16 percent NaCl. The cathode potential was measured with respect to a saturated calomel electrode by use of a Luggin capillary at current densities of 57, 170 and 283 mA/cm$^2$ (0.37, 1.10 and 1.83 A/in$^2$). The cathode potentials measured were 1.115, 1.129 and 1.138 V, respectively. An untreated mild steel coupon yielded cathode potential values of 1.249, 1.367 and 1.419 V on the same basis.

EXAMPLE III

A paste composition comprising 35.9 percent Ni$_3$B and 41.9 percent NiAl$_3$ powders, 13.6 percent vehicle (same as in Example I) and an additional 8.6 percent hexyl carbitol was thoroughly mixed and then blended on a three roll mill. The precedure for milling comprised four passes, the first two at a roll pressure of 3.4 kg/cm$^2$ (50 p.s.i.), the third at 6.8 kg/cm$^2$ (100 p.s.i.) and the fourth at 13.6 kg/cm$^2$ (200 p.s.i.).

A one-inch square (6.45 cm$^2$) of 6 mesh mild steel screen having a mean wire diameter of 0.228 cm (0.090″) was solvent cleaned with perchlor-ethylene and then grit-blasted with #60 Al$_2$O$_3$ grit at 2 kg/cm$^2$ (30 p.s.i.).

The screen was then dipped into the paste, removed after two or three seconds and then allowed to stand in a vertical position until the excess material dripped away. A coating thickness of approximately 35 micrometers was achieved after drying at 125° C. for 15 minutes. The foregong procedure was then repeated until a total coating thickness of approximately 250 micrometers was achieved on the screen surface. All subsequent processing was then carried out according to the procedure given in Example I.

Cathode potential measurements were carried out on the coated screen with respect to a saturated calomel electrode at current densities of 74, 149 and 248 mA/cm$^2$ (0.48, 0.96 and 1.60 A/in$^2$). Cathode potential values of 1.119, 1.124 and 1.131 V were obtained. Untreated mild steel screen yielded cathode potential values of 1.320, 1.400 and 1.450 V, respectively, on the same basis.

EXAMPLE IV

A sample was prepared according to the procedure given in Example I, the only difference being that the sintering temperature was 800° C. and the sintering time was 90 minutes.

Cathode potential measurements were carried out on the coated material with respect to a saturated calomel electrode at current densities of 113, 170 and 226 mA/cm$^2$ (0.73, 1.10 and 1.46 A/in$^2$). Cathode potential values of 1.123, 1.132 and 1.139 V were obtained. An untreated mild steel coupon on the same basis yielded cathode potentials of 1.318, 1.369 and 1.407 V.

EXAMPLE V

A sample was prepared according to the procedure given in Example III the only difference being that the sintering temperature was 800° C. and the sintering time, 90 minutes.

Cathode potential measurements were carried out on the coated screen with respect to a saturated calomel electrode at current densities of 74, 149, and 248 mA/cm$^2$ (0.48, 0.96 and 1.60 A/in$^2$). Cathode potential values of 1.126, 1.134 and 1.140 V were obtained. Untreated mild steel screen yielded cathode potential values of 1.320, 1.400 and 1.450 V, respectively, on the same basis.

I claim:

1. A paste composition suitable for application to a substrate said composition consisting essentially of a mixture of solids containing 40 to 80 percent by weight intermetallic aluminum of the formula NiAl$_3$ and 20 to 60 percent by weight intermetallic boron of the formula Ni$_3$B and an organic liquid vehicle, the solids:liquid vehicle ratio being 4:1 to 8:1.

2. A paste composition according to claim 1 wherein the solids consist of 30 to 50 percent by weight Ni$_3$B and 50 to 70 percent by weight NiAl$_3$.

3. A paste composition according to claim 1 wherein the vehicle is an ethylene glycol copolymer dissolved in hexyl carbitol.

4. A paste composition according to claim 3 wherein the ratio of solids to ethylene glycol copolymer is 25:1 to 30:1.

5. In a process for making a nickel-coated electrode, the improvement wherein a paste composition according to claim 1 is applied to a substrate, is fired in air at 450° to 650° C., sintered in a nitrogen atmosphere at 800° to 900° to form a precursor coating on said substrate consisting of Ni$_2$Al$_3$ and NiAl$_2$B and the intermetallic aluminum and intermetallic boron are thereafter substantially removed by dissolution.

6. The process according to claim 5 wherein the substrate is mild steel and the paste composition is applied by dipping the steel into the paste composition at least three times and drying the paste on the steel after each dipping.

7. A cathode for use in brine electrolysis cells for the production of chlorine, hydrogen and caustic, said cathode being formed by applying to a substrate a paste composition according to claim 1, firing the coating at 450° to 650° C. in air, sintering in a nitrogen atmosphere at 800° to 900° C. to form a precursor structure consisting of Ni$_2$Al$_3$ and NiAl$_2$B and thereafter substantially removing the intermetallic aluminum and intermetallic boron by dissolution to form the cathode.

* * * * *